UNITED STATES PATENT OFFICE.

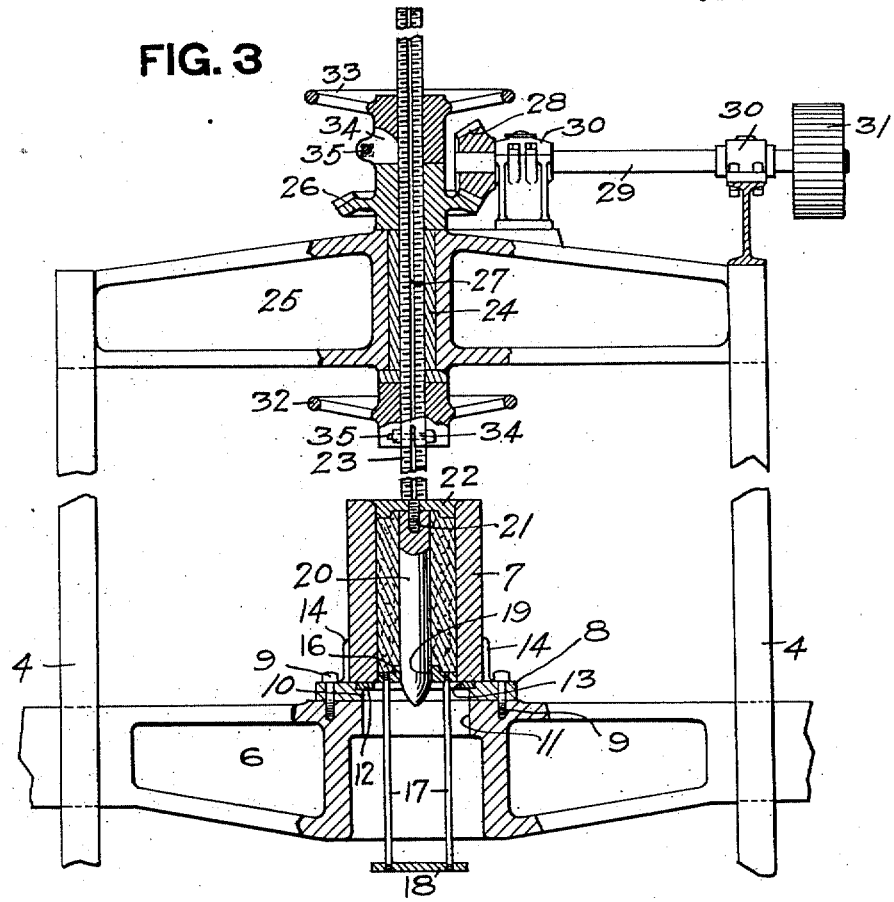
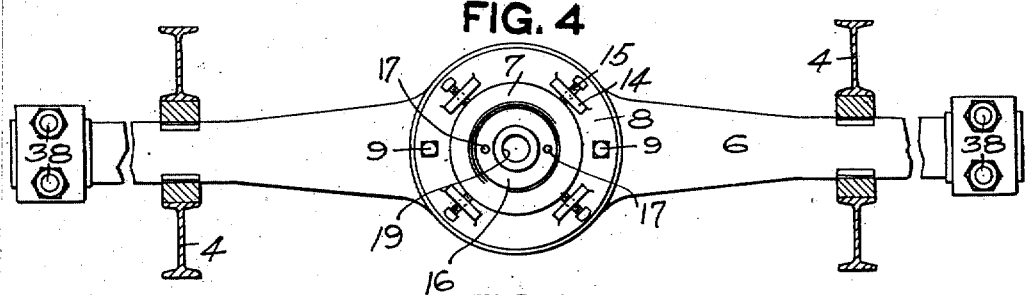
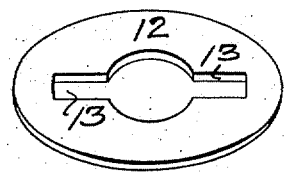

IRA W. BRISON, OF ASPINWALL, AND JAMES A. HUNTER, OF MONONGAHELA, PENNSYLVANIA.

MACHINE FOR MAKING HOLLOW BRICKS.

981,839.   Specification of Letters Patent.   Patented Jan. 17, 1911.

Application filed April 25, 1910. Serial No. 557,476.

*To all whom it may concern:*

Be it known that we, IRA W. BRISON, a resident of Aspinwall, in the county of Allegheny and State of Pennsylvania, and JAMES A. HUNTER, a resident of Monongahela and State of Pennsylvania, have invented a new and useful Improvement in Machines for Making Hollow Bricks; and we do hereby declare the following to be a full, clear, and exact description thereof.

Our invention relates to machines for making hollow brick, and more especially such special shapes made from fire brick as are employed for nozzles, sleeves, stroppers, etc., in connection with the manufacture of steel.

The object of our invention is to provide a machine of this character with increased capacity in which the parts are readily adjusted for bricks of different sizes, so that the machine may be quickly changed without the removal of any of the parts for brick of different sizes, while at the same time the bricks are formed accurately and with smooth, regular bores.

To these ends our invention comprises the novel features hereinafter set forth and claimed.

Figure 1:
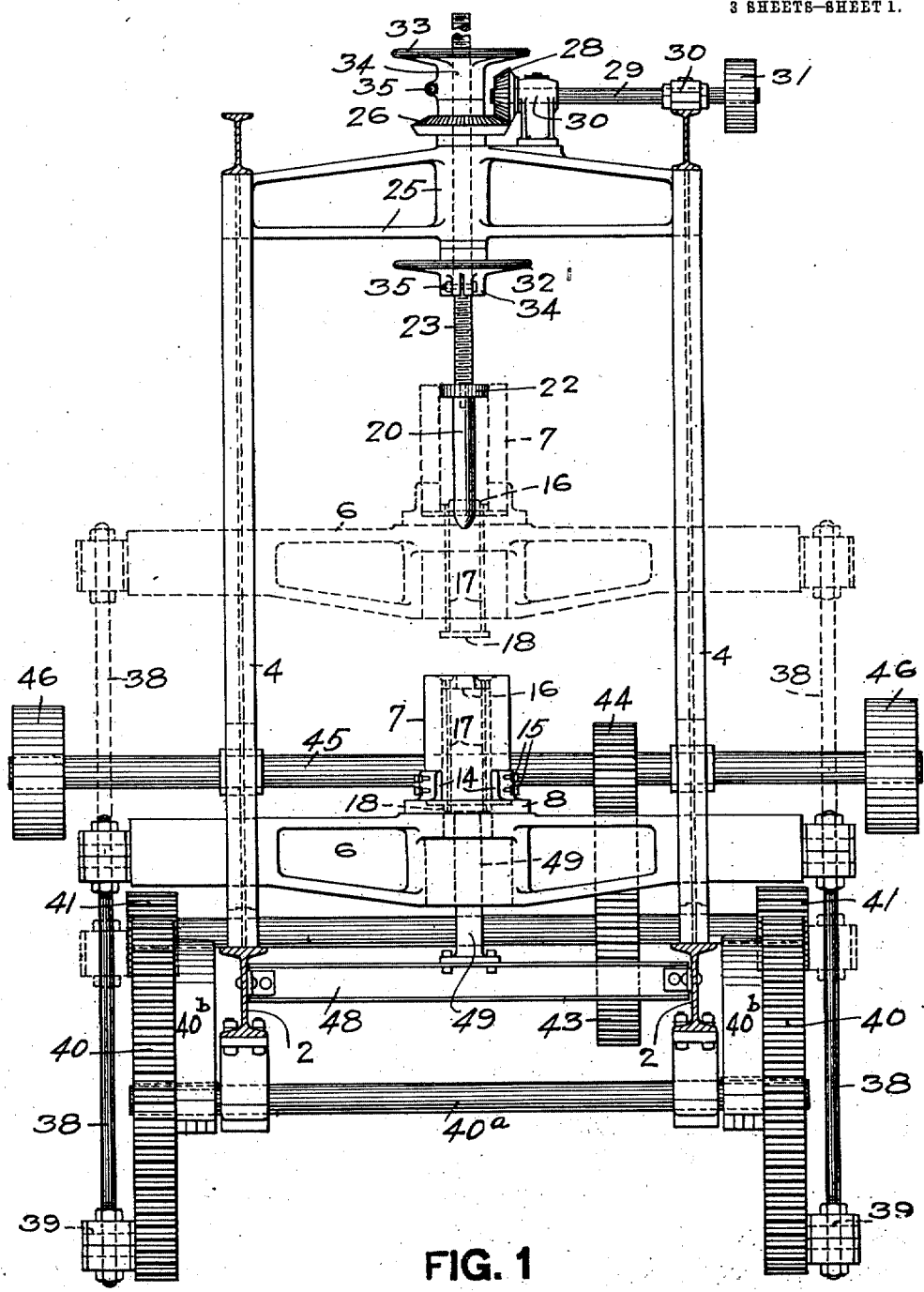
Figure 2:
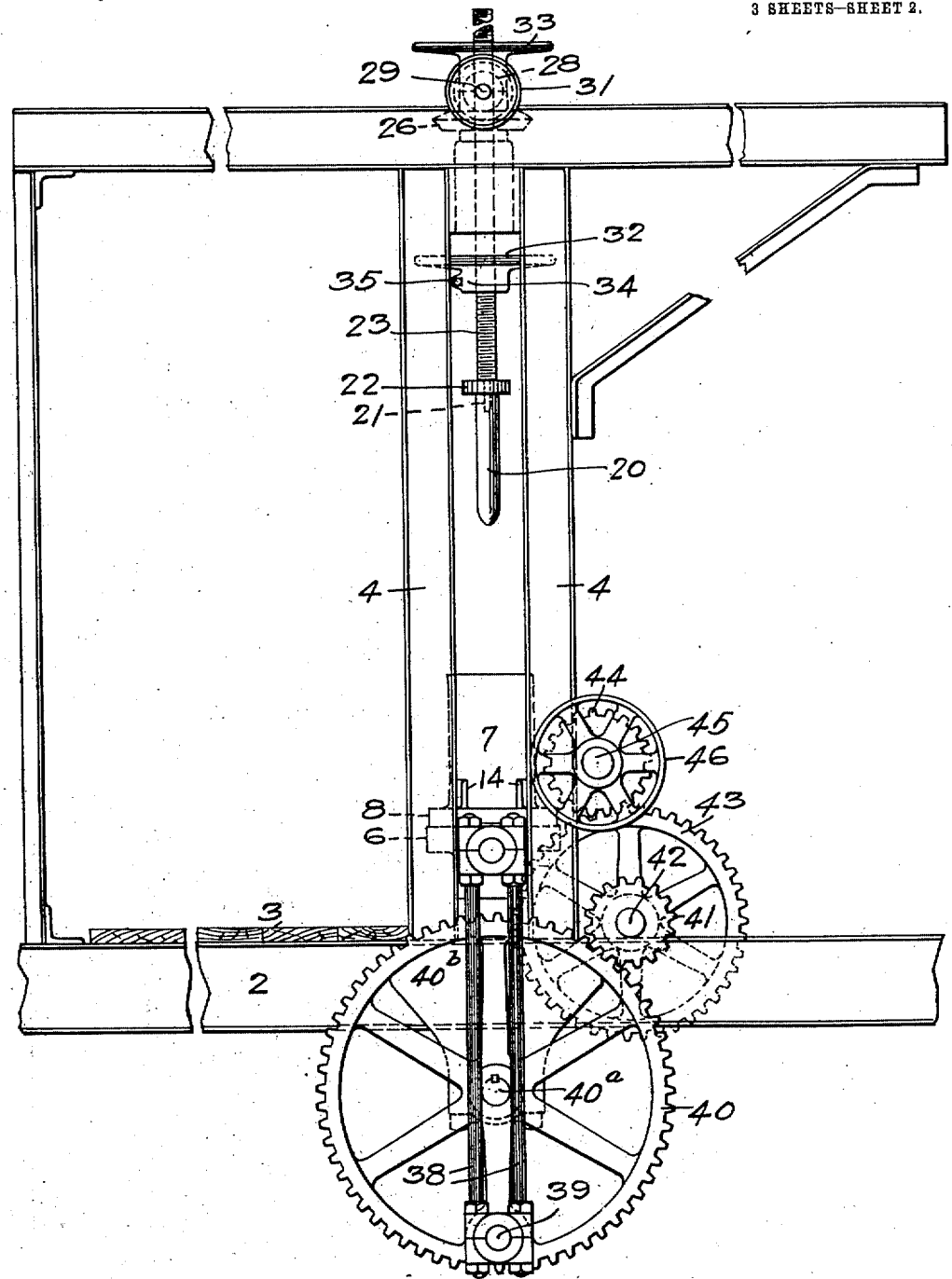

In the accompanying drawings, Figure 1 is a front elevation of our improved machine; Fig. 2 is a side elevation of same; Fig. 3 is an enlarged sectional view showing the parts in the position of molding the brick; and Fig. 4 is a plan view of the mold-supporting frame. Fig. 5 is a detail.

Referring to the drawings, the numeral 2 designates a suitable frame-work formed of I-beams properly braced and united to give a structure of the requisite strength. Upon this frame 2 is the platform 3 upon which the operator may stand. Frame 2 is provided with the vertical I-beams 4 which form the guides for the yoke or frame 6 which carries the mold 7. A plate 8 is secured to the yoke 6 by the screws 9 and said plate has the opening 10 formed therein coinciding with the opening 11 in the frame 6. A ring 12 rests in an annular recess in the plate 8. The plate 8 has upwardly extending lugs 14 by means of which the mold is centered on the plate 8 and adjusting screws 15 pass through said lugs to engage the outer face of the mold 7. In this manner the mold is securely clamped in place.

A stripper-block 16 is secured to the rods 17 which pass through the slotted openings 13 in the ring 12, and at the lower end of the rod 17 is the plate 18. By having the slotted opening 13 different sized stripper-blocks may be employed to suit the different molds. The stripper-block 16 is provided with the opening 19 through which the core 20 passes. The core 20 is secured to the threaded stud 21 on rod 23. The plate 22 is secured to the lower end of the threaded rod 23. This rod 23 passes up through a bushing 24 in the upper cross-frame 25 and secured to the threaded rod 23 above said cross-frame is the pinion 26. The rod 23 is provided with the groove 27 with which a feather on the pinion 26 is adapted to engage. The pinion 28 engages the pinion 26, said pinion 28 being secured to the shaft 29 which rotates in suitable bearing 30. The outer end of the shaft 29 is provided with the pulley 31 which may be connected to any suitable source of power.

The hand-wheels 32 and 33 are mounted on the rod 23, said hand-wheels having split hubs 34 with the bolts 35 passing through the same for tightening said hand-wheels securely on the rod 23. The purpose of these handles 32 and 33 is to provide for the adjustment of the rod 23, it being apparent that by loosening the handle and rotating the same so as to raise it above the hub of the pinion 26 and then rotating the wheel 32, the rod 23 may be fed downwardly or by the reverse operation, namely, loosening the hand wheel and operating the hand-wheel 33, said rod may be raised for the purpose fully hereinafter set forth.

To provide for the raising and lowering of the yoke or frame 6, the pitmen 38 are secured to the ends of the yoke 6 and said pitmen connected at their opposite ends to the wrist-pins 39 on the gear-wheels 40 mounted on the shaft $40^a$. The gear-wheels 40 mesh with the pinions 41 on the shaft 42 and on said shaft 42 is the gear-wheel 43 which meshes with the pinion 44 on the shaft 45. At the outer ends of the shaft 45 are the pulleys 46 which may be connected up to any suitable source of power. In this manner a reciprocating movement is imparted to the yoke or frame 6 said yoke being raised to the position indicated in dotted lines Fig. 1 on its upper stroke. Secured to the shaft $40^a$ are the weights $40^b$ which act to counterbalance the frame or yoke 6. As the yoke ascends the weight acts to raise said yoke steadily and without jamming while at the same time it also lowers said yoke in the same manner. By mounting the weight in this manner the racking of the machine is avoided and the speed of the machine may be increased.

Secured to the frame 2 is the cross-beam 48 to which is secured the arm 49 in the path of the plate 18 of the stripper.

When our improved machine is in operation in the manufacture of hollow-brick, the mold of the proper size and shape is secured to the mold-plate and the core of proper size and shape is also secured to the rod 23, said rod having been adjusted in proper position by means of the hand-wheels 32 or 33. The operator standing on the platform 3 introduces the plastic material from which the brick is to be made into the mold, and as the mold rises, being carried up on the frame 6 by the action of the pitman 38, said mold will be brought up into the position indicated in Fig. 3, the rotating core 20 remaining stationary. The plastic material contained within the mold will be displaced by the core and distributed in the mold in such a way as to conform to the mold-cavity which is controlled by the shape of the core, the stripping-block 16 and the plate 22. When the brick is formed in this way the yoke 6 withdraws from the rotating core which tends to prevent the sticking of the material to the core and leaves a smooth even bore. As the mold descends the stripper carried by the yoke 6 moves with its plate 18 in contact with the arm 49, whereupon the stripper-block is raised and the mold acts to eject the brick therefrom so that when the yoke 6 reaches its lowermost position, the brick will be resting on the block in position on top of the mold where the operator can readily remove the same. The mold is charged with another supply of the plastic material and the operation above described is repeated. In case it is desired to make brick shorter or greater length than the brick shown in the drawings the screw rod 23 may be readily raised or lowered by the hand-wheels 32 or 33, so that when the proper size of core is screwed thereto the said core will be in proper position with reference to the movement of the yoke 6 so as to form the article properly within the mold. This adjustment may be made to a great degree of accuracy, so that a perfect brick is insured and the adjustment may be accomplished so conveniently as to require but little time in the making of such adjustment, there being no need of removing any of the parts. This is a great point of advantage and makes the machine adaptable for all different sizes of brick without any labor other than the mere turning of the hand-wheels to adjust the screw-rod 23.

What we claim is:

1. In machines for making hollow brick, the combination with a suitable frame, of a reciprocating frame, a mold carried thereby, a stationary cross-beam at the upper end of said frame, a rotary screw-rod extending through said cross-beam, means for rotating said screw-rod, a core secured to said screw-rod, and hand wheels above and below said cross-beam for raising and lowering said screw-rod.

2. In machines for making hollow brick, the combination with a suitable frame, of a reciprocating frame, a mold carried thereby, a stationary cross-beam at the upper end of said frame, a rotary screw-rod passing through said cross-beam, a pinion engaging said screw-rod, means for driving said pinion, a hand wheel above said pinion engaging said screw-rod, a hand wheel below said cross-beam, and a core secured to said screw-rod.

In testimony whereof, we the said IRA W. BRISON and JAMES A. HUNTER have hereunto set our hands.

IRA W. BRISON.
JAMES A. HUNTER.

Witnesses:
ROBT. D. TOTTEN,
JOHN F. WILL.